United States Patent
Sato

(10) Patent No.: US 7,088,528 B2
(45) Date of Patent: *Aug. 8, 2006

(54) SINGLE FOCUS LENS INCLUDING A FRONT STOP

(75) Inventor: Kenichi Sato, Ageo (JP)

(73) Assignee: Fujinon Corporation, Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/950,525

(22) Filed: Sep. 28, 2004

(65) Prior Publication Data

US 2005/0068640 A1    Mar. 31, 2005

(30) Foreign Application Priority Data

Sep. 30, 2003  (JP) .............................. 2003-341707

(51) Int. Cl.
*G02B 9/06* (2006.01)
*G02B 13/18* (2006.01)
*G02B 3/02* (2006.01)

(52) U.S. Cl. ...................................... 359/794; 359/717
(58) Field of Classification Search ........ 359/793–795, 359/753, 708, 717
See application file for complete search history.

(56) References Cited

U.S. PATENT DOCUMENTS

| 5,251,069 A | 10/1993 | Iizuka |
| 6,853,504 B1* | 2/2005 | Jo et al. ..................... 359/793 |
| 6,885,508 B1 | 4/2005 | Yamaguchi et al. |
| 2003/0197956 A1 | 10/2003 | Yamakawa |
| 2005/0002117 A1 | 1/2005 | Ninomiya et al. |

FOREIGN PATENT DOCUMENTS

JP    2000-258684    9/2000

* cited by examiner

*Primary Examiner*—Alicia M Harrington
(74) *Attorney, Agent, or Firm*—Arnold International; Jon W. Henry; Bruce Y. Arnold

(57) ABSTRACT

A single focus lens includes, in order from the object side: a diaphragm stop; and first and second lens components, each lens component being of positive refractive power and each having a convex surface on the object side at least near the optical axis. Each of the two lens components has two aspheric surfaces, may be a lens element, and preferably is made of plastic. The single focus lens may include no other lens elements and the diaphragm stop may be on the object side of the single focus lens. Specified on-axis conditions are satisfied in order to reduce aberrations and to make the single focus lens compact. Additionally, satisfying a condition related to the aspheric shapes of the lens components helps reduce aberrations.

10 Claims, 4 Drawing Sheets

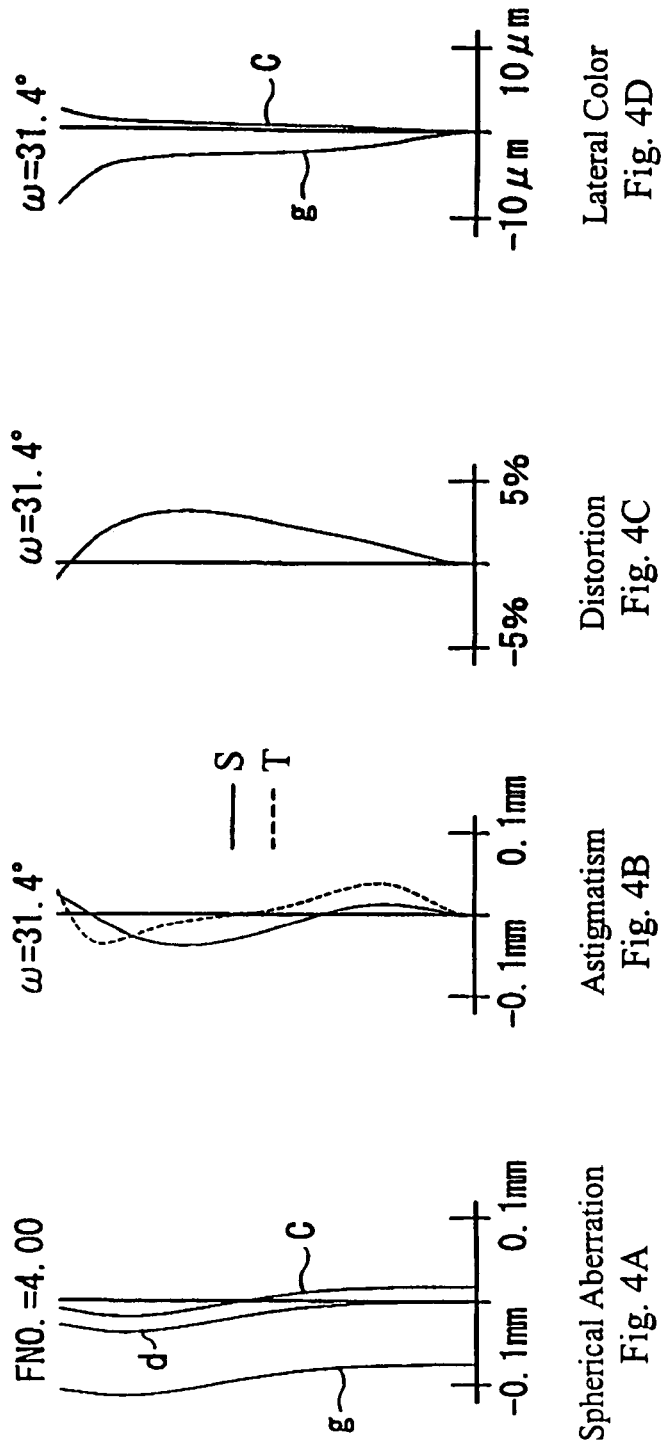

Lateral Color

Distortion

Astigmatism

Spherical Aberration

SINGLE FOCUS LENS INCLUDING A FRONT STOP

BACKGROUND OF THE INVENTION

In recent years, along with the popularization of personal computers into homes, digital still cameras (hereinafter referred to simply as digital cameras) that enable input of picture image information, such as photographed landscapes and portraits, into a personal computer are rapidly becoming more popular. Additionally, with enhancements in portable telephone functions, portable cameras that include compact imaging modules are rapidly becoming more popular. Additionally, including an imaging module in compact information terminal equipment, such as PDAs (Personal Digital Assistants), is becoming popular.

In such devices that include an imaging function, an image pickup element, such as a CCD (Charge Coupled Device) or a CMOS (Complementary Metal Oxide Semiconductor), is used to provide the imaging function. Recently, advancements in the miniaturization of such image pickup elements have been rapidly increasing. This has resulted in a desire for the main body of such devices and other imaging equipment, such as the imaging lens system, to also be further miniaturized. Additionally, image pickup elements with a larger number of pixels in the same area have been developed in order to achieve higher image quality, which creates a demand for higher resolution lens systems that are still very compact. Japanese Laid-Open Patent Application 2000-258684 describes exemplary single focus imaging lenses for such devices that include only two lens elements.

As stated above, recent image pickup elements are smaller and provide more pixels in a given detector area, which helps meet demands of higher resolution and more compactness that are especially required in imaging lenses for digital cameras. Although considerations of small cost and compactness have been the main considerations for imaging lenses for compact information terminal equipment, such as portable telephones with cameras, such devices have been commercialized with megapixel detectors (detectors that detect one million or more pixels), indicating increasing demand for higher performance in these devices as well. Therefore, development of lens systems with a wide range of applications based on properly balancing considerations of cost, performance, and compactness is desired.

As imaging lenses for compact information terminal equipment having a large number of pixels, conventionally there has been developed a lens system having three lens components, each of which may be a lens element, with at least two lens elements being made of plastic, while the third lens element may be made of plastic or glass. However, in order to meet recent demands for greater miniaturization, a lens that uses a smaller number of lens components and lens elements, but which is equivalent in performance to these conventional lenses, is desired.

Although the lenses described in Japanese Laid-Open Patent Application 2000-258684, referenced above, each have a two-component, two element lens construction, which includes aspheric surfaces, a lens system that is even more compact and higher in performance than this is desired. Because the lateral color aberration tends to become especially large in compact imaging lenses, particularly desired is a single focus lens with well corrected lateral color.

BRIEF SUMMARY OF THE INVENTION

The present invention relates to a single focus lens that can be extremely compact, uses a small number of lens components and lens elements, can be manufactured at low cost, and can achieve high optical performance by particular use of aspheric lens surfaces. The present invention relates particularly to such a single focus lens that can be mounted in small information terminal equipment such as portable phones with a camera and in PDAs.

BRIEF DESCRIPTION OF THE DRAWINGS

The present invention will become more fully understood from the detailed description given below and tile accompanying drawings, which are given by way of illustration only and thus are not limitative of the present invention, wherein:

FIGS. 4A–4D show the spherical aberration, astigmatism, distortion, and lateral color, respectively, of the single focus lens according to Embodiment 1.

DETAILED DESCRIPTION

Figure 1:
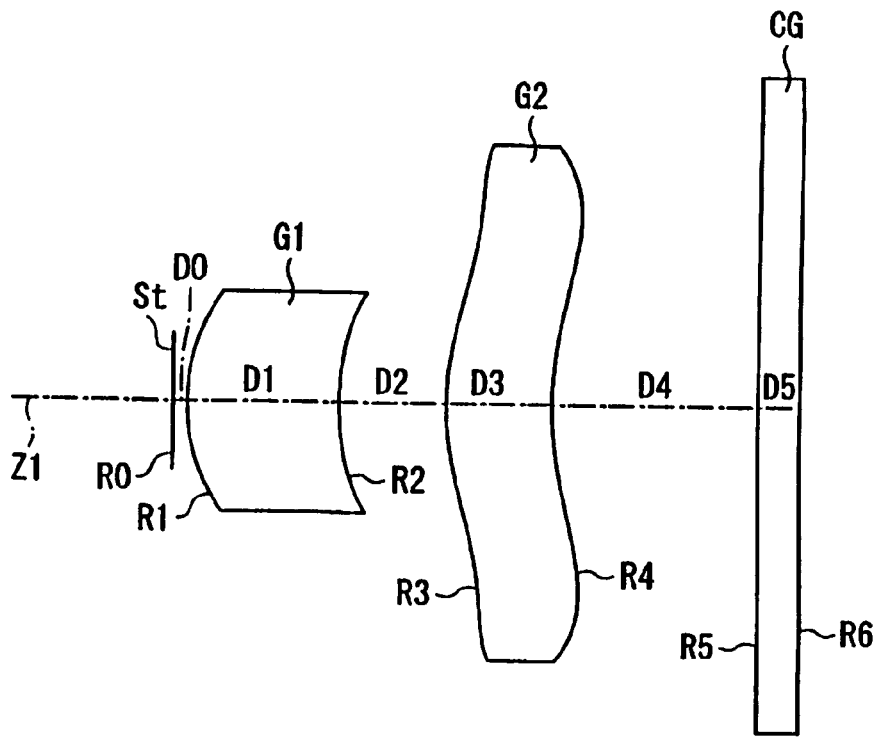
FIG. 1 shows a cross-sectional view of the single focus lens according to Embodiment 1.

A general description of the preferred embodiments of the single focus lens of the present invention will now be described with reference to FIG. 1. FIG. 1 shows a cross-sectional view of the single focus lens of Embodiment 1. In FIG. 1, the lens elements of the single focus lens are referenced by the symbols G1 and G2, in order from the object side of the single focus lens along the optical axis Z1. Additionally, a cover glass on the image side of the second lens element G2 is referenced by the symbol CG. The radii of curvature of the lens elements G1, G2, and the cover glass CG are referenced by the letter R followed by a number denoting their order from the object side of the single focus lens, from R0 to R6. The on-axis surface spacings along the optical axis Z1 between the surfaces of the optical elements are referenced by the letter D followed by a number denoting their order from the object side of the single focus lens, from D0 to D5. In FIG. 1, the image plane (not shown) is on the image side of the cover glass CG. The single focus lens further includes a diaphragm stop St on the object side of the first lens element G1. The stop St operates as an aperture stop.

Definitions of the terms "lens element" and "lens component" that relate to this detailed description will now be given. The term "lens element" is herein defined as a single transparent mass of refractive material having two opposed refracting surfaces, which surfaces are positioned at least generally transversely of the optical axis of the single focus lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

In accordance with the definitions of "lens component," and "lens element" above, lens elements may also be lens components. Thus, the present invention may variously be described in terms of lens elements or in terms of lens components.

The single focus lens of the present invention can be used, for example, in a digital camera or a portable modular camera that uses an image pickup element, such as a CCD (not shown). As shown in FIG. 1, the single focus lens includes, arranged in order from the object side along the optical axis Z1, the stop St, the first lens element G1, the second lens element G2, and the cover glass CG, with the image pickup element (not shown) being at the image plane (not shown) close to and on the image side of the cover glass CG. The cover glass CG is arranged at or adjacent the image plane so as to protect the image-detecting elements of the CCD. In addition to the cover glass CG, other optical elements such as an infrared cut-off filter and/or a low-pass filter may also be arranged between the second lens element G2 and the image plane.

The first lens element G1 is of positive refractive power, is of meniscus shape with a convex surface on its object side near the optical axis, and has aspheric shapes on both surfaces. Also, the second lens element G2 is of positive refractive power, is of meniscus shape with a convex surface on its object side near the optical axis, and has aspheric shapes on both surfaces. Preferably, the image-side surface of the second lens element G2 has a concave shape associated with negative refractive power near the optical axis Z1, the absolute value of the refractive power of the image-side surface decreases toward the periphery of the image-side surface within the effective diameter of the second lens element G2, and the image-side surface becomes convex near the periphery of the lens surface.

The lens surfaces that are aspheric are defined using the following equation:

$$Z=[(CY^2)/\{1+(1-K \cdot C^2 \cdot Y^2)^{1/2}\}]+\Sigma(A_i \cdot Y^i)$$ Equation (A)

where
Z is the length (in mm) of a line drawn from a point on the aspheric lens surface at a distance Y from the optical axis to the tangential plane of the aspheric surface vertex,
C is the curvature (=1/the radius of curvature, R) of the aspheric lens surface on the optical axis,
Y is the distance (in mm) from the optical axis,
K is the eccentricity, and
$A_i$ is the with aspheric coefficient, and the summation extends over i.

In the embodiments of the invention disclosed below, aspheric coefficients other than $A_3$-$A_{11}$ are zero for all lens surfaces and for two lens surfaces the aspheric coefficients $A_{11}$ are also zero.

The shape of each aspheric lens surface on the optical axis is expressed by the portion of Equation (A) that relates to the eccentricity K and not by the polynomial part that relates to the aspheric coefficient $A_i$.

The single focus lens is constructed so that it satisfies the following Conditions (1) and (2):

$0.20<R1/f<0.70$ Condition (1)

$0.05<D2/f1<0.3$ Condition (2)

where
R1 is the radius of curvature on the optical axis Z1 of the object-side surface of the first lens element G1,
f is the local length of the entire single focus lens on the optical axis Z1,
D2 is the distance on the optical axis Z1 from the image-side lens surface of the first lens element G1 to the object-side lens surface of the second lens element G2, and
f1 is the local length of the first lens element G1 on the optical axis Z1.

If Condition (1) is not satisfied, it becomes especially difficult to correct coma aberration and lateral color aberration. If Condition (2) is not satisfied, it becomes difficult to obtain a proper distance to the exit pupil of the single focus lens while reducing the total length of the single focus lens.

Additionally, by placing the stop St on the object side of the single focus lens, by having a first lens element G1 and a second lens element G2 in order from the object side with no intervening lens element, each of which has aspheric shapes on both surfaces, and by making the shapes and the distribution of refractive power among the lens elements appropriate by satisfying Conditions (1) and (2) above, a high performance, single focus lens that effectively uses aspheric surfaces and is equivalent to a conventional three-component, three-element single focus lens but is extremely compact can be realized.

Additionally, the single focus lens preferably satisfies the following Condition (3):

$0.70<\Delta ZF/\Delta ZR<1.20$ Condition (3)

where
$\Delta ZF$ is the object-side shape displacement at the maximum height at which an image forming light ray passes through the object-side surface of the first lens element G1, and
$\Delta ZR$ is the image-side shape displacement at the maximum height at which an image forming light ray passes through the image-side surface of the first lens element G1.

Figure 3:
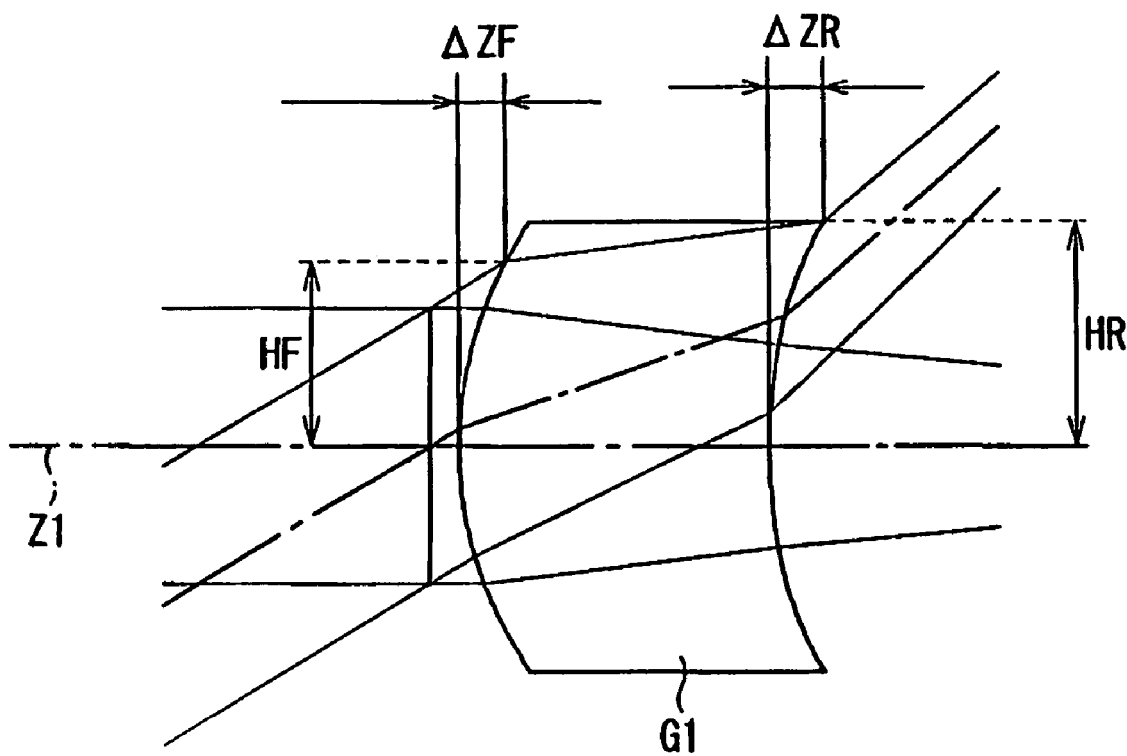
FIG. 3 shows a cross-sectional view of a first lens element according to the present invention with various heights and shape displacements indicated.

The term "shape displacement" is herein defined as follows with reference to FIG. 3 that shows a cross-sectional view of the first lens element G1 with various heights and shape displacements indicated. As shown in FIG. 3, shape displacement is defined as the distance in the direction of the optical axis from a plane perpendicular to the optical axis that passes through the vertex of the lens element on the optical axis (i.e., a plane passing through the object-side vertex for an "object-side shape displacement" and a plane passing through the image-side vertex for an "image-side shape displacement") to the object-side surface of the lens element for an object-side shape displacement and to the image-side surface of the lens element for an image-side shape displacement. The maximum height at which an image forming light ray passes through the object-side surface of the first lens element G1 is designated as dimension HF in FIG. 3; the maximum height at which an image forming light ray passes through the image-side surface of the first lens element G1 is designated as dimension HR in FIG. 3; and, as shown in FIG. 3, the heights are measured perpendicular to the optical axis Z1.

If Condition (3) is not satisfied, it becomes difficult to correct lateral color aberration and to keep the zoom lens compact. In general, higher performance can be achieved by satisfying Condition (3).

Because both surfaces of each of the first lens element G1 and the second lens element G2 are aspheric, it is preferable that the lens elements be made of plastic for ease of manufacture of the lens elements.

Embodiments 1 and 2 of the present invention will now be individually described with further reference to the drawings. In the following descriptions, references will be frequently made to a "lens element." However, as set forth above, it is understood that lens elements described below are also lens components and may variously be replaced by lens components that include more than one lens element.

Embodiment 1

FIG. 1 shows Embodiment 1 of the present invention. Table 1 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element for Embodiment 1. Listed in the bottom portion of Table 1 are the focal length f on the optical axis of the entire single focus lens, the f-number $F_{NO}$, and the maximum field angle $2\omega$.

TABLE 1

| # | R | D | $N_d$ | $v_d$ |
|---|---|---|---|---|
| 0 (stop) | ∞ | 0.10 | | |
| 1* | 1.3593 | 1.07 | 1.49023 | 57.5 |
| 2* | 2.0342 | 0.77 | | |
| 3* | 1.9183 | 0.76 | 1.49023 | 57.5 |
| 4* | 2.7125 | 1.47 | | |
| 5 | ∞ | 0.30 | 1.51680 | 64.2 |
| 6 | ∞ | | | | f = 3.88 mm $F_{NO}$ = 4.0 $2\omega$ = 62.8°

The surfaces with a * to the right of the surface number in Table 1 are aspheric lens surfaces, and the aspheric surface shapes are expressed by Equation (A) above.

Table 2 below lists the values of the constant K and the aspheric coefficients $A_3$–$A_{11}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E-2" represents the number $1.0 \times 10^{-2}$.

The single focus lens of Embodiment 1 satisfies Conditions (1)–(3) above, as set forth in Table 3 below.

TABLE 3

| Condition No. | Condition | Value |
|---|---|---|
| (1) | 0.20 < R1/f < 0.70 | 0.350 |
| (2) | 0.05 < D2/f1 < 0.3 | 0.140 |
| (3) | 0.70 < ΔZF/ΔZR < 1.20 | 0.859 |

FIGS. 4A–4D show the spherical aberration, astigmatism, distortion, and lateral color, respectively, of the single focus lens according to Embodiment 1. In FIG. 4A, the spherical aberration is shown for the d-line ($\lambda$=587.6 nm), the g-line ($\lambda$=435.8 nm), and the C-line ($\lambda$=656.3 nm). As shown in FIG. 4A, the f-number is 4.00. In FIG. 4B, the astigmatism is shown at the d-line ($\lambda$=587.6 nm) for both the sagittal image surface S and the tangential image surface T. In FIG. 4C, the distortion is shown at the d-line ($\lambda$=587.6 nm). The half-field angle $\omega$ for FIGS. 4B–4D is 31.4°. FIG. 4D shows the lateral color at the g-line ($\lambda$=435.8 nm) and the C-line ($\lambda$=656.3 nm) relative to the d-line ($\lambda$=587.6 nm).

As is clear from the lens data and aberration curves discussed above, in Embodiment 1 the various aberrations are favorably corrected, and performance capabilities that are suitable for a compact single focus lens can be obtained.

Embodiment 2

Figure 2:
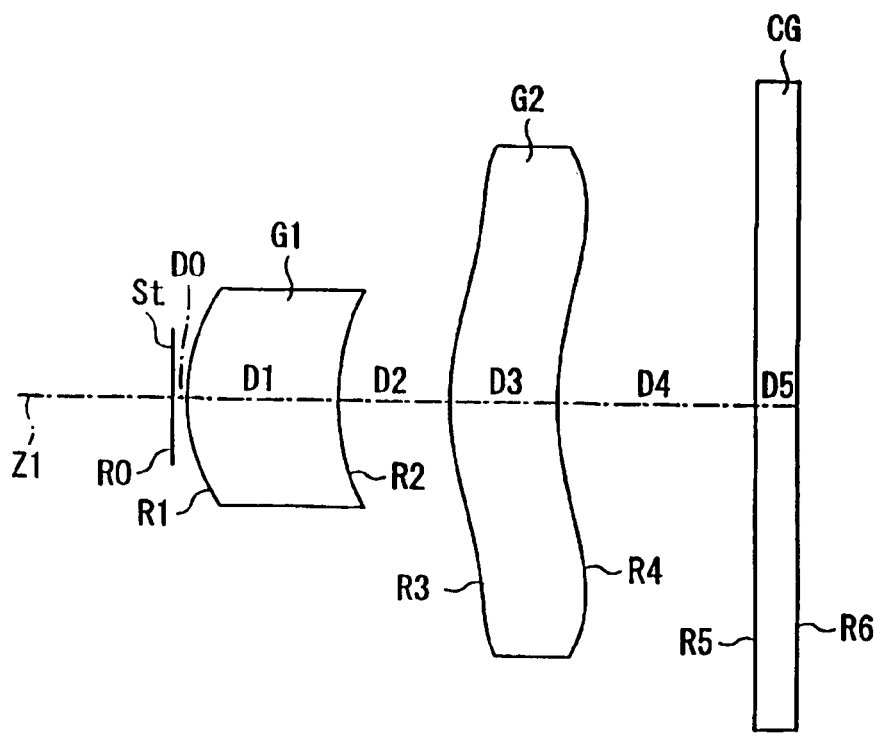
FIG. 2 shows a cross-sectional view of the single focus lens according to Embodiment 2.

FIG. 2 shows Embodiment 2 of the present invention. Table 4 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element for Embodiment 2. Listed in the bottom portion of Table 4 are the focal length f on the optical axis of the entire single focus lens, the f-number $F_{NO}$, and the maximum field angle $2\omega$.

TABLE 4

| # | R | D | $N_d$ | $v_d$ |
|---|---|---|---|---|
| 0 (stop) | ∞ | 0.10 | | |
| 1* | 1.3719 | 1.07 | 1.50614 | 56.4 |
| 2* | 2.0183 | 0.80 | | |
| 3* | 1.9545 | 0.77 | 1.50614 | 56.4 |
| 4* | 2.6721 | 1.40 | | |
| 5 | ∞ | 0.30 | 1.51680 | 64.2 |
| 6 | ∞ | | | | f = 3.86 mm $F_{NO}$ = 4.0 $2\omega$ = 62.4°

TABLE 2

| # | K | $A_3$ | $A_4$ | $A_5$ | $A_6$ |
|---|---|---|---|---|---|
| 1 | −3.0745 | −1.8805E−3 | 2.1433E−1 | −2.1934E−3 | −8.4643E−2 |
| 2 | −7.8053 | −1.4739E−4 | 1.3597E−1 | −8.9841E−2 | 1.1562E−1 |
| 3 | −4.8078 | −6.3892E−3 | 3.3547E−2 | −7.3035E−2 | 4.7785E−3 |
| 4 | −1.2813E+1 | 1.3748E−2 | 1.1463E−1 | −1.6157E−1 | 1.8012E−2 |

| | $A_7$ | $A_8$ | $A_9$ | $A_{10}$ | $A_{11}$ |
|---|---|---|---|---|---|
| 1 | −7.6625E−4 | −5.5160E−3 | −5.2935E−5 | 7.8333E−3 | −1.5620E−7 |
| 2 | 1.1486E−3 | −6.2875E−2 | 2.8489E−4 | 1.4840E−2 | 7.2171E−7 |
| 3 | 1.3592E−2 | 3.9501E−3 | −5.1694E−3 | 1.2360E−3 | 0 |
| 4 | 4.2400E−2 | −1.2415E−2 | −5.7540E−3 | 2.2176E−3 | 0 |

The surfaces with a * to the right of the surface number in Table 4 are aspheric lens surfaces, and the aspheric surface shapes are expressed by Equation (A) above.

Table 5 below lists the values of the constant K and the aspheric coefficients $A_3$–$A_{11}$ used in Equation (A) above for each of the aspheric lens surfaces of Table 4. Aspheric coefficients that are not present in Table 5 are zero. An "E" in the data indicates that the number following the "E" is the exponent to the base 10. For example, "1.0E−2" represents the number $1.0 \times 10^{-2}$.

TABLE 5

| # | K | $A_3$ | $A_4$ | $A_5$ | $A_6$ |
|---|---|---|---|---|---|
| 1 | −3.2140 | −3.1235E−3 | 2.1416E−1 | −2.3302E−3 | −8.4657E−2 |
| 2 | −7.8289 | 9.4261E−4 | 1.3614E−1 | −8.8468E−3 | 1.1564E−1 |
| 3 | −4.8149 | −6.3826E−3 | 3.3606E−2 | −7.2874E−2 | 4.8141E−3 |
| 4 | −1.2811E+1 | 1.4430E−2 | 1.1490E−1 | −1.6114E−1 | 1.8122E−2 |

| | $A_7$ | $A_8$ | $A_9$ | $A_{10}$ | $A_{11}$ |
|---|---|---|---|---|---|
| 1 | −7.7443E−4 | −5.5168E−3 | −5.3374E−5 | 7.8333E−3 | −1.5710E−7 |
| 2 | 1.1690E−3 | −6.2870E−2 | 2.8580E−4 | 1.4840E−2 | 7.2440E−7 |
| 3 | 1.3671E−2 | 3.9689E−3 | −5.1362E−3 | 1.2441E−3 | 0 |
| 4 | 4.2537E−2 | −1.2371E−2 | −5.7094E−3 | 2.2275E−3 | 0 |

The single focus lens of Embodiment 2 satisfies Conditions (1)–(3) above, as set forth in Table 6 below.

TABLE 6

| Condition No. | Condition | Value |
|---|---|---|
| (1) | 0.20 < R1/f < 0.70 | 0.355 |
| (2) | 0.05 < D2/f1 < 0.3 | 0.148 |
| (3) | 0.70 < ΔZF/ΔZR < 1.20 | 0.849 |

Figure 5D:
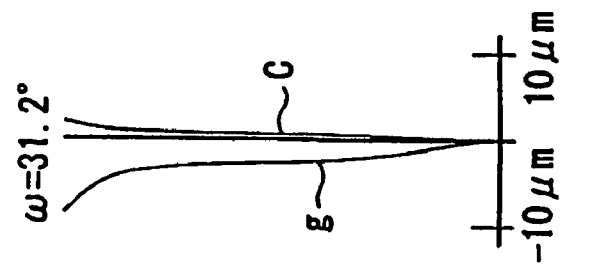
FIGS. 5A–5D show the spherical aberration, astigmatism, distortion, and lateral color, respectively, of the single focus lens according to Embodiment 2.
Figure 5C:
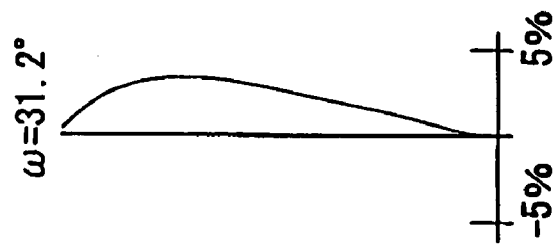
Figure 5B:
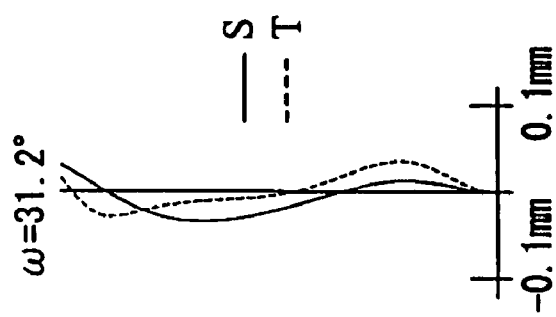
Figure 5A:
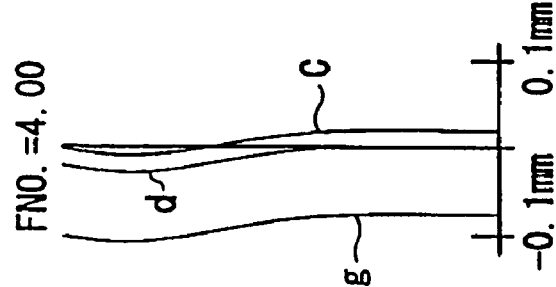

FIGS. 5A–5D show the spherical aberration, astigmatism, distortion, and lateral color, respectively, of the single focus lens according to Embodiment 2. In FIG. 5A, the spherical aberration is shown for the d-line ($\lambda$=587.6 nm), the g-line ($\lambda$=435.8 nm), and the C-line ($\lambda$=656.3 nm). As shown in FIG. 5A, the f-number is 4.00. In FIG. 5B, the astigmatism is shown at the d-line ($\lambda$=587.6 nm) for both the sagittal image surface S and the tangential image surface T. In FIG. 5C, the distortion is shown at the d-line ($\lambda$=587.6 nm). The half-field angle ω for FIGS. 5B–5D is 31.2°. FIG. 5D shows the lateral color at the g-line ($\lambda$=435.8 nm) and the C-line ($\lambda$=656.3 nm) relative to the d-line ($\lambda$=587.6 nm).

As is clear from the lens data and aberration curves discussed above, in Embodiment 2 the various aberrations are favorably corrected, and performance capabilities that are suitable for a compact single focus lens can be obtained.

The invention being thus described, it will be obvious that the same may be varied in many ways. For instance, values such as the radius of curvature R of each of the lens elements, the surface spacing D, the refractive index $N_d$, as well as the Abbe number $v_d$, are not limited to the examples indicated in each of the aforementioned embodiments, as other values can be adopted. Also, lens elements that act as lens components may variously be modified as lens components that include more than one lens element. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A single focus lens comprising, arranged along an optical axis in order from the object side:
   a stop on the object side of the single focus lens;
   a first lens component of positive refractive power and a meniscus shape, having both surfaces aspheric, and having its convex surface on the object side;
   a second lens component of positive refractive power and a meniscus shape, having both surfaces aspheric and, at least near the optical axis, having a convex surface on the object side; wherein
   the following conditions are satisfied:

$0.20 < R1/f < 0.70$ $0.05 < D2/f1 < 0.3$ where
   R1 is the radius of curvature on the optical axis of the object-side surface of the first lens component,
   f is the focal length of the entire single focus lens on the optical axis.
   D2 is the distance on the optical axis from the image-side lens surface of the first lens component to the object-side lens surface of the second lens component, and
   f1 is the focal length of first lens component on the optical axis; and the following condition is satisfied:

$0.70 < \Delta ZF/\Delta ZR < 1.20$ where
   ΔZF is the object-side shape displacement at the maximum height at which an image forming light ray passes through the object-side surface of the first lens component, and
   ΔZR is the image-side shape displacement at the maximum height at which an image forming light ray passes through the image-side surface of the first lens component.

2. The single focus lens of claim 1, wherein the first lens component is a lens element.

3. The single focus lens of claim 2, wherein the second lens component is a lens element.

4. The single focus lens of claim 3, wherein each of the first lens component and the second lens component is made of plastic.

5. The single focus lens of claim 1, wherein the stop, the first lens component, and the second lens component are arranged in that order along the optical axis from the object side without any intervening lens element.

6. The single focus lens of claim 5, wherein each of the first and second lens components consists of a lens element.

7. The single focus lens of claim 1, wherein the single focus lens is formed of only two lens components.

8. The single focus lens of claim 7, wherein the first lens component is a lens element.

9. The single focus lens of claim 8, wherein the second lens component is a lens element.

10. The single focus lens of claim 9, wherein each of the first and second lens components is made of plastic.

* * * * *

UNITED STATES PATENT AND TRADEMARK OFFICE
CERTIFICATE OF CORRECTION

PATENT NO. : 7,088,528 B2 Page 1 of 1
APPLICATION NO. : 10/950525
DATED : August 8, 2006
INVENTOR(S) : Sato It is certified that error appears in the above-identified patent and that said Letters Patent is hereby corrected as shown below:

On The Title Page:
Item (56) - "References Cited"
change "5,251,069 A" to -- 5,251,069 -- ;
change "6,853,504 B1" to -- 6,853,504 B2 -- ; and
change "6,885,508 B1" to -- 6,885,508 B2 -- .

Signed and Sealed this

Twenty-first Day of November, 2006

JON W. DUDAS
*Director of the United States Patent and Trademark Office*